United States Patent
Yoo

(10) Patent No.: US 11,960,595 B2
(45) Date of Patent: *Apr. 16, 2024

(54) SYSTEM, METHOD, AND PROGRAM FOR PROVIDING VIRTUAL CODE, VIRTUAL CODE GENERATING DEVICE, AND VIRTUAL CODE VERIFYING DEVICE

(71) Applicant: SSenStone Inc., Seoul (KR)

(72) Inventor: Chang Hun Yoo, Seoul (KR)

(73) Assignee: SSenStone Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/168,184

(22) Filed: Feb. 13, 2023

(65) Prior Publication Data

US 2023/0185897 A1 Jun. 15, 2023

Related U.S. Application Data

(63) Continuation of application No. 17/738,751, filed on May 6, 2022, now Pat. No. 11,609,983, which is a
(Continued)

(30) Foreign Application Priority Data

Aug. 9, 2017 (KR) ................. 10-2017-0100952

(51) Int. Cl.
*G06F 21/45* (2013.01)
*G06F 21/31* (2013.01)
*H04L 9/40* (2022.01)

(52) U.S. Cl.
CPC .............. *G06F 21/45* (2013.01); *G06F 21/31* (2013.01); *H04L 63/0838* (2013.01)

(58) Field of Classification Search
CPC ....... G06F 21/45; G06F 21/31; H04L 63/0838
(Continued)

(56) References Cited

U.S. PATENT DOCUMENTS

| | | | |
|---|---|---|---|
| 6,904,526 | B1 | 6/2005 | Hongwei |
| 7,984,491 | B2 | 7/2011 | Ueda et al. |

(Continued)

FOREIGN PATENT DOCUMENTS

| | | |
|---|---|---|
| CN | 101573723 A | 11/2009 |
| CN | 102984127 A | 3/2013 |

(Continued)

OTHER PUBLICATIONS

Seung-Hyun Seo, "One-Time Virtual Card Number Generation & Transaction Protocol using Integrated Authentication Center", Journal of the Korean Institute of Information Security and Cryptology; Jun. 30, 2010; vol. 20, Issue 3, pp. 9-21; ISSN 1598-3978; with an English abstract.

(Continued)

*Primary Examiner* — Dereena T Cattungal
(74) *Attorney, Agent, or Firm* — Studebaker & Brackett PC

(57) ABSTRACT

A system, a method, and a program for providing a virtual code, a virtual code generating device, and a virtual code verifying device are provided. The method includes receiving, by a virtual code verifying means, a virtual code from a virtual code generating means, extracting, by the virtual code verifying means, a plurality of detailed codes included in the virtual code, and searching for, by the virtual code verifying means, a storage location of a real code based on the plurality of detailed codes.

11 Claims, 10 Drawing Sheets

Related U.S. Application Data continuation of application No. 16/928,687, filed on Jul. 14, 2020, now Pat. No. 11,354,401, which is a continuation of application No. 15/801,905, filed on Nov. 2, 2017, now Pat. No. 10,754,942.

(58) Field of Classification Search
USPC .......................................................... 726/6
See application file for complete search history.

(56) References Cited

U.S. PATENT DOCUMENTS

| | | | |
|---|---|---|---|
| 9,652,770 B1* | 5/2017 | Kurani | G06Q 20/10 |
| 2005/0216744 A1 | 9/2005 | Skygebjer | |
| 2007/0055630 A1 | 3/2007 | Gauthier et al. | |
| 2008/0154772 A1 | 6/2008 | Carlson | |
| 2008/0201265 A1 | 8/2008 | Hewton | |
| 2009/0048971 A1 | 2/2009 | Hathaway et al. | |
| 2009/0182654 A1 | 7/2009 | Mullen et al. | |
| 2011/0145579 A1 | 6/2011 | Shin et al. | |
| 2012/0116902 A1* | 5/2012 | Cardina | G06Q 20/10 705/17 |
| 2014/0040139 A1* | 2/2014 | Brudnicki | G06Q 20/3224 705/44 |
| 2014/0129360 A1* | 5/2014 | Kobayashi | G06Q 20/385 705/21 |
| 2014/0136355 A1* | 5/2014 | Park | G06Q 20/322 705/21 |
| 2014/0258134 A1 | 9/2014 | Park et al. | |
| 2015/0134540 A1 | 5/2015 | Law et al. | |
| 2016/0027000 A1 | 1/2016 | Kurian | |
| 2016/0189123 A1 | 6/2016 | Lucia Specogna et al. | |
| 2017/0126408 A1 | 5/2017 | Van Someren | |
| 2017/0185991 A1 | 6/2017 | Park et al. | |
| 2017/0195320 A1 | 7/2017 | Yoo et al. | |
| 2019/0050556 A1 | 2/2019 | Yoo | |

FOREIGN PATENT DOCUMENTS

| | | |
|---|---|---|
| CN | 105009140 A | 10/2015 |
| CN | 105933119 A | 9/2016 |
| CN | 106664200 A | 5/2017 |
| EP | 2296311 A1 | 3/2011 |
| JP | 2000-214944 A | 8/2000 |
| JP | 2009-053756 A | 3/2009 |
| KR | 10-1316466 B1 | 10/2013 |
| KR | 10-1499535 B1 | 3/2015 |
| KR | 10-1621254 B1 | 5/2016 |
| KR | 10-2016-0122683 A | 10/2016 |
| WO | 2016/064127 A1 | 4/2016 |

OTHER PUBLICATIONS

Search Report issued by Intellectual Property Office of Singapore in SG Patent Application No. 10201709085W; completed May 7, 2018.
Search Report issued by Intellectual Property Office of Singapore in SG Patent Application No. 10201806382W; completed Mar. 25, 2019.
An Office Action mailed by China National Intellectual Property Administration on Aug. 18, 2021, which corresponds to Chinese Patent Application No. 201710805548.7 and is related to U.S. Appl. No. 16/928,687 with English language translation.
International Search Report issued in PCT/KR2017/008631; dated May 8, 2018.
Search Report issued by Intellectual Property Office of Singapore in SG Patent Application No. 10201904496V; completed Jun. 17, 2020.
An Office Action mailed by the Korean Intellectual Property Office dated Jul. 24, 2019, which corresponds to Korean Patent Application No. 10-2019-0017818 and is related to U.S. Appl. No. 16/928,687.
The extended European search report issued by the European Patent Office dated Mar. 29, 2018, which corresponds to European Patent Application No. 18152461.2-1218 and is related to U.S. Appl. No. 15/801,905.

* cited by examiner

SYSTEM, METHOD, AND PROGRAM FOR PROVIDING VIRTUAL CODE, VIRTUAL CODE GENERATING DEVICE, AND VIRTUAL CODE VERIFYING DEVICE

CROSS-REFERENCE TO RELATED APPLICATIONS

The present application is a continuation of U.S. patent application Ser. No. 17/738,751 filed on May 6, 2022, which is a continuation of U.S. patent application Ser. No. 16/928,687 filed on Jul. 14, 2020, which is a continuation of U.S. patent application Ser. No. 15/801,905, filed on Nov. 2, 2017, which claims the benefit of priority under 35 U.S.C. § 119 to Korean Patent Application No. 10-2017-0100952 filed Aug. 9, 2017, in the Korean Intellectual Property Office, the entire contents of which are hereby incorporated by reference.

BACKGROUND

Embodiments of the inventive concept described herein relate to a system, method, and program for providing a virtual code, a virtual code generating device, and a virtual code verifying device, and more particularly, relate to a system, method, and program for generating a virtual code generated not to be duplicated for each time and searching for a real code based on the virtual code, an apparatus for generating the virtual code which is not duplicated for each time, and an apparatus for searching for the real code based on the virtual code.

Code-type data may be used in many areas. An Internet personal identification number (IPIN), a resident registration number, or the like for identifying a user as well as a card number used upon payment and an account number may be code-type data.

However, there may be many accidents where such code data is hacked in a process of using the code data. In case of a card number, since a real card number is written on a card surface without change, the card number may be visually flowed out to others. A card number may be hacked while it is transmitted to a POS device without change upon payment using a magnetic portion.

There have been may attempts to use a virtual code such that a real code is not hacked without change. However, there is a need for data for identifying a user to search for a real code corresponding to a virtual code. For example, in case of a one time password (OTP), a code is changed and generated per time, but a log-in procedure is needed to determine an algorithm assigned to a user. Further, it is difficult to apply the OTP to various areas.

Therefore, there is a need for technologies for searching for a real code based on a virtual code changed in real time without providing identification information about a user or device, corresponding to a real code.

SUMMARY

Embodiments of the inventive concept provide a system, method, and program for providing a virtual code, a virtual code generating device, and a virtual code verifying device, for searching for a real code based on the virtual code without a separate procedure for identifying a virtual code generating means.

Embodiments of the inventive concept provide a system, method, and program for providing a virtual code, a virtual code generating device, and a virtual code verifying device, for providing a virtual code newly generated at intervals of a unit count without being duplicated and generated in the entire period by all virtual code generating means.

According to an aspect of an embodiment, a method for providing a virtual code may include receiving, by a virtual code verifying means, the virtual code from a virtual code generating means, the virtual code being generated by combining a plurality of detailed codes according to a specific rule, extracting, by the virtual code verifying means, the plurality of detailed codes included in the virtual code, and searching for, by the virtual code verifying means, a storage location of a real code based on the plurality of detailed codes. The virtual code verifying means and the virtual code generating means may include the same virtual code generation function. The plurality of detailed codes may include a first code for setting a start point for searching for the storage location and a second code for setting a search path from the start point to the storage location according to a specific search scheme. The first code and the second code may be changed per unit count. The virtual code verifying means may include a storage location search algorithm configured to adjust the storage location of the real code to be matched with the first code and the second code generated per unit count. If a virtual code normally generated per unit count is received, a point moved along a search path corresponding to the second code from the start point corresponding to the first code may be calculated as the storage location. The unit count may be set at a specific time interval and is changed as the time interval elapses.

If the first code or the second code of N (N is a natural number) digits is generated with M (M is a natural number) characters, the virtual code generation function may include a first function or a second function for providing different $M^N$ codes as the first code or the second code sequentially changed per unit count.

The second code may be generated based on a unit count which elapses from a time when the real code for the virtual code generating means is newly generated.

The searching for the storage location of the real code may include, if the storage location search algorithm performs rolling motion of a k-gon on a track where k (k is $M^N$) codes are sorted such that a vertex corresponds to a point where each code is arranged, performing the rolling motion of the k-gon to a point on the track, corresponding to the first code in the virtual code received from the virtual code generating means, setting a location corresponding to the first code to a search start point and searching for a storage location in an arrangement state of the k-gon based on the second code according to a search scheme applied to the second code, the storage location being matched to each vertex of the k-gon, and extracting the real code included in the storage location.

The method may further include, if a request to newly generate a real code in a specific count is received from a specific virtual code generating means, storing the real code in a storage location corresponding to a specific vertex of the k-gon in the specific count, the specific vertex being a point where the track and the k-gon are met in the specific count.

The virtual code generation function may include a detailed code combination function corresponding to a rule of sorting the plurality of detailed codes.

The detailed code generation function may apply a specific sorting rule of sorting M characters in an ascending order. The M characters may include at least one of an uppercase alphabet, a lowercase alphabet, a numeral, and a special character.

The virtual code may further include a fixed code for determining a group which includes the virtual code generation means. The extracting of the plurality of detailed codes may include extracting the fixed code from the virtual code and determining a group of the virtual code generation means based on the fixed code and determining the virtual code generation function or the storage location search algorithm for the group.

The virtual code may further include a secure code of a specific-digit number. The method may further include verifying, the virtual code verifying means, the virtual code by determining, the virtual code verifying means, whether a reception secure code received from the virtual code generation means with a generation secure code generated in the virtual code verifying means.

The secure code may be generated by using an eigen identification value and generation time data of the virtual code generating means as a function value. The virtual code verifying means may receive and store the eigen identification value when a real code for the virtual code generating means is generated.

The method may further include verifying, by the virtual code verifying means, whether the first code or the second code corresponds to a normally generated virtual code by applying, by the virtual code verifying means, an inverse function of a first function or a second function to the first code or the second code.

The method may further include comparing a first reception code received from the virtual code generating means with a first generation code generated according to a first function included in the virtual code verifying means, if the first reception code is included in an allowable error range from the first generation code, setting the first reception code to the first code which corresponds to the start point, and, if the first reception code departs from the allowable error range from the first generation code, determining the first reception code as an abnormal code.

According to another aspect of an embodiment, a program for providing a virtual code may be combined with hardware, execute the method for providing the virtual code, and be stored in a medium.

According to another aspect of an embodiment, a virtual code generating device may include a detailed code generating unit configured to generate one or more detailed codes, a virtual code generating unit configured to generate a virtual code by combining the one or more detailed codes, and a virtual code providing unit configured to output the virtual code to the outside to provide the virtual code to a virtual code verifying device. The virtual code may be generated by combining a plurality of detailed codes according to a specific rule. The plurality of detailed codes may include a first code for setting, by the virtual code verifying device, a start point for searching for a storage location and a second code for setting, by the virtual code verifying device, a search path from the start point to the storage location according to a specific search scheme. The first code and the second code may be changed per unit count. The virtual code verifying device may include a storage location search algorithm configured to adjust a storage location of a real code to be matched with the first code and the second code generated per unit count. If a virtual code normally generated per unit count is received, a point moved along a search path corresponding to the second code from the start point corresponding to the first code may be calculated as the storage location. The unit count may be set at a specific time interval and is changed as the time interval elapses.

According to another aspect of an embodiment, a virtual code verifying device may include a receiving unit configured to receive the virtual code from a virtual code generating device, a detailed code extracting unit configured to extract a plurality of detailed codes included in the virtual code, and a real code search unit configured to search for a storage location of the real code based on the plurality of detailed codes. The virtual code verifying device and the virtual code generating device may include the same virtual code generation function. The virtual code may be generated by combining the plurality of detailed codes according to a specific rule. The plurality of detailed codes may include a first code for setting, by the real code search unit, a start point for searching for the storage location and a second code for setting, by the real code search unit, a search path from the start point to the storage location according to a specific search scheme. The real code search unit may include a storage location search algorithm configured to adjust the storage location of the real code to be matched with the first code and the second code which are changed and provided per unit count from the virtual code generating device. If a virtual code normally generated per unit count is received, a point moved along a search path corresponding to the second code from the start point corresponding to the first code may be calculated as the storage location. The unit count may be set at a specific time interval and is changed as the time interval elapses.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
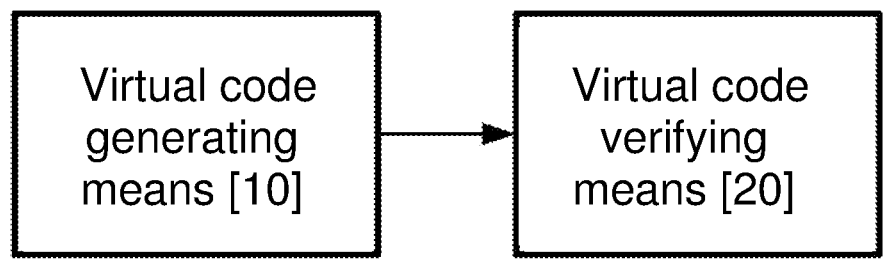
FIG. 1 is a block diagram illustrating a configuration of a system for providing a virtual code according to an embodiment of the inventive concept.

Hereinafter, a description will be given in detail of exemplary embodiments of the inventive concept with reference to the accompanying drawings. Advantages, features, and methods of accomplishing the same will become apparent with reference to embodiments described in detail below together with the accompanying drawings. However, the inventive concept is not limited by embodiments disclosed hereinafter, and may be implemented in various forms. Rather, these embodiments are provided to so that this disclosure will be through and complete and will fully convey the concept of the invention to those skilled in the art, and the inventive concept will only be defined by the appended claims. Like reference denotations refer to like elements throughout the specification.

Unless otherwise defined herein, all terms (including technical and scientific terms) used in the specification may have the same meaning that is generally understood by a person skilled in the art. Also, terms which are defined in a dictionary and commonly used should be interpreted as not in an idealized or overly formal detect unless expressly so defined.

Terms used in the specification are used to describe embodiments of the inventive concept and are not intended to limit the scope of the inventive concept. In the specification, the terms of a singular form may include plural forms unless otherwise specified. The expressions "comprise" and/or "comprising" used herein indicate existence of one or more other elements other than stated elements but do not exclude presence of additional elements.

The term "character" in the specification may be an element configuring a code and may include all or some of an uppercase alphabet, a lowercase alphabet, a numeral, a special character, and the like.

The term "code" in the specification may refer to a string where characters are arranged.

The term "real code" in the specification may refer to an actually used code. For example, if a code is a card number, the real code may be a real card number issued on a card of a specific user from a card issuer.

The term "virtual code" in the specification may refer to a code temporarily generated be connected to a real code.

The term "detailed code" in the specification may refer to a partial code included in a virtual code. In other words, if the virtual code is generated by combining a plurality of separately generated codes, the detailed code may refer to a separate code which is separately generated and configures the virtual code.

The term "unit count" in the specification may be a unit defined as being set at a specific time interval and being changed as the time interval elapses. For example, 1 count may be used by being set to a specific time interval (e.g., 1.5 seconds).

The term "virtual code generation function" in the specification may refer to a function used to generate a virtual code.

The term "smart card" in the specification may refer to a card, a card number of which is changed and output.

The term "rolling motion" in the specification may mean that an object performs a translation motion while rotating. In other words, the term "rolling motion" may mean that the object moves while performing a rotational motion and the translation motion together and may mean that the object moves while each point of the rotating object is in contact with a moving axis in turn.

Hereinafter, a description will be given in detail of a system, method, and program for providing a virtual code, a virtual code generating device 100, and a virtual code verifying apparatus 200 with reference to drawings.

FIG. 1 is a block diagram illustrating a configuration of a system for providing a virtual code according to an embodiment of the inventive concept.

Referring to FIG. 1, the system for providing the virtual code may include a virtual code generating means 10 and a virtual code verifying means 20.

The virtual code generating means 10 may play a role in generating a virtual code including information for searching for a real code at the virtual code verifying means 20. In other words, the virtual code generating means 10 may generate the virtual code according to a virtual code generation function. In this case, since the virtual code verifying means 20 searches for the real code based on the virtual code, the virtual code generating means 10 may fail to store the real code. Thus, the real code may be prevented from being hacked through hacking of the virtual code generating means 10 and the like. A description will be given in detail of the virtual code generation function.

The virtual code verifying means 20 may play a role in searching for the real code based on the virtual code provided from the virtual code generating means 10. The virtual code verifying means 20 may store the same virtual code generation function as the virtual code generating means 10 to search for the real code from the virtual code received from the virtual code generating means 10. A description will be given in detail of a manner of searching for the real code based on the virtual code at the virtual code verifying means 20.

Further, the virtual code verifying means 20 may play a role in verifying whether a virtual code is a code normally generated by the virtual code generating means 10. A description will be given in detail of a manner of determining whether the virtual code is normal at the virtual code verifying means 20.

The virtual code verifying means 20 may receive the virtual code from the virtual code generating means 10 in various manners. As an embodiment, the virtual code verifying means 20 may receive a virtual code through wireless communication from the virtual code generating means 10. Further, as another embodiment, the virtual code verifying means 20 may directly receive a virtual code, which is generated by the virtual code generating means 10 and is provided to the user, from him or her.

Further, as another embodiment, the virtual code verifying means 20 may receive a virtual code from a server which receives the virtual code from the virtual code generating means 10. For example, assuming that the virtual code generating means 10 is a payment card, that the virtual code is a virtual card number with which a real card number is replaced, and that the virtual code verifying means 20 is a card issuer server including a virtual code generation function, if payment is performed on a point of sales (POS) device by the card which is the virtual code generating means 10, the virtual code verifying means 20 may receive the virtual card number (i.e., the virtual code) from a payment gateway (PG) server which receives the virtual card number from the POS device. In other words, the virtual code verifying means 20 (i.e., the card issuer server) may receive a virtual card number rather than a real card number from the virtual code generating means 10 using a conventional payment process.

Further, as an embodiment, the virtual code verifying means 20 and the virtual code generating means 10 may include the same virtual code generation function. As the virtual code verifying means 20 and the virtual code generating means 10 include the same virtual code generation function, the virtual code verifying means 20 may correctly extract a plurality of detailed codes in the virtual code generated by the virtual code generating means 10. Further, the virtual code verifying means 20 may verify whether the received virtual code is generated and received by the normal virtual code generating means 10. In other words, the virtual code verifying means 20 may perform verification by generating a code (i.e., a virtual code or a specific detailed code) in the same condition as the virtual code generating means 10 and comparing the generated code with a code (i.e., a virtual code or a specific detailed code) received from the virtual code generating means 10.

Figure 2:
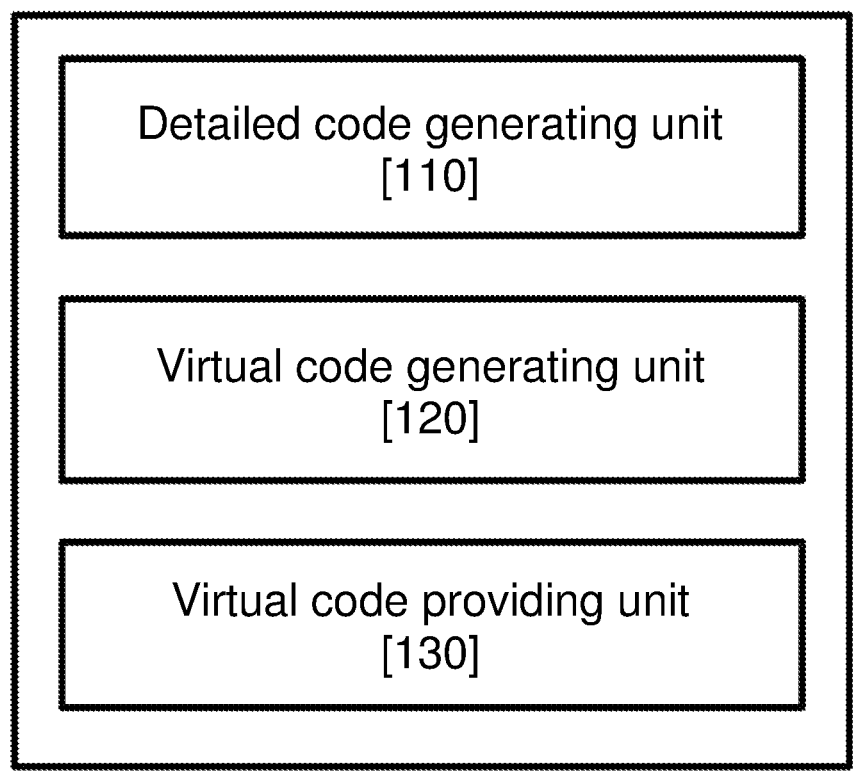
FIG. 2 is a block diagram illustrating a configuration of a virtual code generating device according to another embodiment of the inventive concept.

FIG. 2 is a block diagram illustrating a configuration of a virtual code generating device 100 for generating a virtual code according to another embodiment of the inventive concept.

Referring to FIG. 2, the virtual code generating device 100 according to another embodiment of the inventive concept may include a detailed code generating unit 110, a virtual code generating unit 120, and a virtual code providing unit 130.

The virtual code generating device 100 according to embodiments of the inventive concept may be a device in which a program corresponding to a virtual code generating means 10 is embedded or installed. For example, if a virtual code is a virtual card number, the virtual code generating device 100 may be a smart card in which the program corresponding to the virtual code generating means 10 is embedded. Further, for example, if the virtual code is the virtual card number, the virtual code generating device 100 may be a mobile terminal in which an app card application corresponding to the virtual code generating means 10 is installed. Further, for example, if the virtual code is a virtual authentication key for an Internet of things (IoT) device, the virtual code generating device 100 may be a control device (i.e., a remote controller) in which the program corresponding to the virtual code generating means 10 is embedded. The virtual code generating device 100 may be applied to various cases where it generates a virtual code and transmits the virtual code to another unit (e.g., another device or a server) other than the above-mentioned example.

The virtual code generating unit 120 may play a role in generating a virtual code by combining one or more detailed codes. As an embodiment, the virtual code may be generated by combining a plurality of detailed codes according to a specific rule. A virtual code generation function may include a rule (i.e., a detailed code combination function) for combining the plurality of detailed codes.

A variety of manners may be applied to the manner of generating the one virtual code by combining the plurality of detailed codes. As an example of the detailed code combination function, the virtual code generating unit 120 may generate the virtual code in a manner of alternately arranging a first code of N digits and a second code of the N digits. Further, as another example, the detailed code combination function may be a function of combining the second code after the first code. As a detailed code included in a virtual function is increased, the detailed code combination function may be generated in various manners.

The detailed code generating unit 110 may play a role in generating one or more detailed codes. A virtual code generation function may include each detailed code generation function. For example, the virtual code generation function may be to generate a plurality of detailed codes using a plurality of detailed code generation functions and generate a virtual code using a detailed code combination function for combining the plurality of detailed codes.

As an embodiment, the detailed code generating unit 110 may include a first function and a second function as a detailed code generation function and may generate a first code and a second code. The first code and the second code may have correlation for searching for a storage location of a real code in a virtual code verifying means 20 of FIG. 1. However, the virtual code generating device 100 may include the first function for generating the first code and the second function for generating the second code as the detailed code generation function for enhancing security and may fail to include data for correlation between the first code and the second code.

Further, as another embodiment, a virtual code may include a fixed code which is not changed for distinguishing a group together with a plurality of detailed codes. The virtual code verifying means 20 may include several virtual code generation functions respectively corresponding to several groups. If receiving a virtual code from the virtual code generating device 100, the virtual code verifying means 20 may search for a real code based on a virtual code generation function of a group to which the virtual code generating device 100 belongs. If the virtual code does not include a fixed code and if the entire code includes only a detailed code newly generated whenever a unit count elapses, the virtual code verifying means 20 may fail to determine a group to which the virtual code generating device 100 belongs without separate information. Thus, the virtual code generating device 100 may include the fixed code which is not changed for identifying a group.

For example, if a real code is a real card number and if a virtual code generation function is assigned for each card type of a specific card issuer, the virtual code generating device 100 may use the first 6 digits indicating a card issuer and a card type in a card number as a fixed code. The virtual code verifying means 20 may identify a specific card type of a specific card issuer to which the same virtual code generation function as the virtual code generating device 100 is applied.

Also, for example, if a resident registration number is a real code and if persons having the same date of birth is determined as the same group, the virtual code generating device 100 may set 6 digits corresponding to the date of birth among all 13 digits of the resident registration number to a fixed code and may newly generate the other 7 digits per unit count based on a virtual code generation function. The virtual code verifying means 20 may receive a virtual code and may determine a group based on the 6 digits of the fixed code.

Further, as an embodiment, the virtual code may further include a secure code. For example, the virtual code may include a plurality of detailed codes and the secure code. The secure code may be a code generated based on a specific secure code generation function and may be used to verify whether the virtual code is a normal virtual code. The secure code generation function may be to generate a secure code of a specific-digit number by using time data and an eigen value of the virtual code generating means 10 as a function value.

An example of a process of determining whether the virtual code is normal using the secure code is described hereinafter. The virtual code verifying means 20 may receive an eigen value of the virtual code generating device 100 (e.g., an eigen value of a chip in a smart card, an eigen value of a smartphone in which an app card is installed, or the like) when a real code is issued, and may store the received eigen value together in a storage location of a real code or may store the received eigen value in a separate storage space connected to the storage location of the real code. If the virtual code generating device 100 generates the virtual code with which the secure code is combined and provides the virtual code to the virtual code verifying means 20, the virtual code verifying means 20 may calculate a secure code by obtaining time data about a time when the virtual code is generated based on a detailed code, extracting a specific eigen value stored in the virtual code generating device 100, and may applying the extracted eigen value together with the time data to a secure code generation function. The virtual code verifying means 20 may determine whether a secure code (i.e., a reception secure code) received by the virtual code generating device 100 is identical to a secure code (i.e., a generation secure code) calculated using a secure code generation function stored in the virtual code verifying means 20. If the reception secure code is identical to the generation secure code, the virtual code verifying means 20 may determine the virtual code as a normal virtual code and may provide a real code.

For example, if a real code is a number included in a card (e.g., a card number, an expiration date, and a card security number) (i.e., if the virtual code generating device 100 is a smart card), the secure code may be generated as the card security number. In other words, the virtual code generating device 100 may generate 3 or 4 digits corresponding to the card security number as the secure code using a secure code generation function. If the secure code is entered as the card security number when a card is used, the virtual code verifying means 20 may perform a process of verifying the secure code.

Further, for another example, the secure code generation function may be to generate a different code of I digits (I is a natural number) for each count and apply the generated code together as a function value. In other words, the secure code generation function may include a random code generation function of I digits.

Further, as an embodiment, if the virtual code is generated by a combination according to a specific rule of the first code and the second code, each of the first code and the second code may play a role for searching for a storage location where a real code is stored. For example, the first code may be to set a start point for searching for the storage location, and the second code may be to set a search path from the start point to the storage location according to a specific search scheme. In other words, if a virtual code normally generated per unit count is received from the apparatus 100, the virtual code verifying means 20 may determine a point moved along the search path corresponding to the second code from the start point corresponding to the first code as the storage location of the real code. A description will be given of a detailed manner of searching for the storage location based on the first code and the second code configuring the virtual code.

As an embodiment of a manner in which the detailed code generating unit 110 generates a detailed code, the detailed code generating unit 110 may generate a new detailed code per unit count. Thus, the virtual code generating device 100 may generate a new virtual code per unit count. The virtual code newly generated per unit count may fail to be duplicated and generated. In detail, the detailed code generating unit 110 may be configured such that the virtual code newly generated per unit count is not duplicated and generated during a predetermined period of time to a specific user or the specific virtual code generating device 100 and such that the virtual code is not duplicated and generated between users who belong to a specific group.

As a detailed embodiment of preventing the virtual code from being duplicated and generated, if the first code or the second code of N digits is generated with M characters, a detailed code generation function included in a virtual code generation function may be to generate $M^N$ codes as the first code or the second code and match each code for each count from an initial time when the detailed code generation function is driven. For example, if a unit count is set to 1 second, the detailed code generation function may be to match different $M^N$ codes every second from a time when the detailed code generation function is initially driven. If a period when a specific detailed code generation function is used or a use period of the virtual code generating device 100 (e.g., an expiration date of a smart card which generates a virtual card number) is set to a time length which is shorter than a time length (e.g., $M^N$ seconds if 1 count is 1 second) corresponding to $M^N$ counts, the same code of the first code or the second code may fail to be duplicated and generated during the use period. In other words, when a count is increased over time, if a user requests the virtual code generating device 100 to generate a virtual code at a specific time, the virtual code generating device 100 may generate a code value matched to a count corresponding to the specific time as the first code or the second code.

As another detailed embodiment of preventing the virtual code from being duplicated and generated, if a use period of the virtual code generating device 100 elapses, a function (i.e., the first function or the second function) of generating the first code or the second code may be changed or a matching relationship between the first code and the second code may be changed to generate a virtual code different from a previous use period. If the virtual code is generated by combining the first code generated by the first function with the second code generated by the second function and if a first code generation function or a second code generation function is changed, as an order where the first code or the second code appears is different from the previous use period, the virtual code generating device 100 may apply a virtual code generation function of generating a virtual code different from the previous use period to a new use period. The virtual code generating device 100 may select the first function and the second function such that the same code as a virtual code used in the previous use period does not appear as a virtual code of each count within the new use period (i.e., such that a matching relationship between the first code generated according to the first function and the second code generated according to the second function is not included in matching relationships included in the previous use period in all counts of the new use period). In other words, the virtual code generating device 100 may apply a virtual code generation function of the new use period when a virtual code overlapped with the previous use period is not generated by adjusting or updating a virtual code generation function after a use period for applying every $M^N$ codes elapses.

In this case, each of the virtual code generating means 10 and the virtual code verifying means 20 may store a rule of updating a virtual code generation function. In other words, each of the virtual code generating means 10 and the virtual code verifying means 20 may store an order or rule in which a plurality of first and second functions are applied to each use period.

Further, as another detailed embodiment of preventing the virtual code from being duplicated and generated, any one of the first code or the second code included in the virtual code may be generated by reflecting a value (i.e., a device identification value) which differently exist always at the same time every the at least virtual code generation device 100, such that the same virtual code is not generated at the same time between users who belong to the same group. As an embodiment, the device identification value may be a time (or a count number) which elapses from a time when the specific virtual code generating device 100 is included in a group to which a specific detailed code generation function is applied (e.g., a time started to apply the detailed code generation function to the specific virtual code generating device 100 after a specific time elapses from an initial time when the specific detailed code generation function in the virtual code verifying means 20 is driven) to a current time. If the plurality of virtual code generating device 100 are included in one group and if counts set such that the plurality of virtual code generating device 100 belong to the group are identical to each other (i.e., if the plurality of virtual code generating devices 100 simultaneously belong to the group), a time which elapses from a time (or count) when the virtual code generating device 100 belongs to the group to a specific time may vary for each virtual code generating device 100. Thus, as at least any one of detailed code generation functions uses the time, which elapses from the time (or count) when the virtual code generating device 100 belongs to the group to the specific time, as a device identification value, a virtual code generated by each of the plurality of virtual code generating devices 100 may vary for each time. Thus, the virtual code generating device 100 may be distinguished by receiving the virtual code at the virtual code verifying means 20 rather than separately receiving data for identifying a user.

For example, if the virtual code generating device 100 is a card (e.g., a smart card, an app card, or the like) which may change an output card number, a specific card type of a specific card issuer may be set to one group. The specific virtual code verifying means 20 in a card issuer server may be driven for the group. If a first user requests the first virtual code generating device 100 (i.e., the virtual code generating device 100 of the first user) to issue a card at a time which elapses from the virtual code verifying means 20 is driven by time A and if a second user requests the second virtual code generating device 100 (i.e., the second virtual code generating device 100 of the second user) to issue a card at a time which elapses from the virtual code verifying means 20 is driven by time B (B is a value greater than A), a time length of a time which elapses from a time when a card is issued may vary always in time C (C is a value greater than B) when it is requested to generate the virtual code from the first user and the second user. Thus, as a detailed code generation function applies a time length of a time which elapses from a time when a card is issued to each of the plurality of virtual code generating devices 100 to a variable, the same virtual card number may fail to be generated at the same time.

Since a time length of a time which elapses from a time when the specific virtual code generating device 100 belongs to a specific group continue increasing over time, a detailed code (e.g., a second code) generated by the specific virtual code generating device 100 may fail to be generated as the same value and may be continuously generated as a different value.

As another detailed embodiment of preventing the virtual code from being duplicated and generated, the first code may be set to a code value corresponding to a time (or count) which is requested to generate the virtual code among codes matched for each count from an initial time when the first function is driven in the virtual code verifying means 20, and the second code may be set to a code value generated by reflecting a value (i.e., a device identification value) which differently exists always at the same time for each virtual code generating device 100, such that a duplicated virtual code is not generated irrespective of a user in the entire period. The virtual code may be used as a code value in which the first code and the second code are combined. Since the first code has a different code value for each count and since the second code has a different code value for each virtual code generating device 100 at the same time, a virtual code in which the first code and the second code are combined may be output as different code values all the virtual code generating devices 100 and all times.

Further, as another embodiment, any one of a plurality of sorting rules of sorting M characters in an ascending order may be applied to the virtual code generation function (or the detailed code generation function). In other words, the virtual code generating device 100 (i.e., the virtual code generating means 10) may apply a rule of sorting the M characters in the ascending order to a detailed code generation function included in the virtual code generation function in various manners. A sorting rule of sorting uppercase alphabets in an ascending order may be an order of A, B, C, . . . , and Z, which is a general order, or may be an order of A, C, B, . . . , and Z. As a sorting rule varies in the virtual code generation function, an order where a code is matched in each count in turn from an initial time when the virtual code generation function is driven may vary. The virtual code verifying means 20 may match a code generated according to the same sorting rule to each count or may store the same sorting rule itself, included in the virtual code generation function. Thus, as a virtual code generation function for each group includes a different detailed code combination function or a different character sorting rule, the virtual code verifying means 20 may have a different virtual code generation function for each group.

Figure 3:
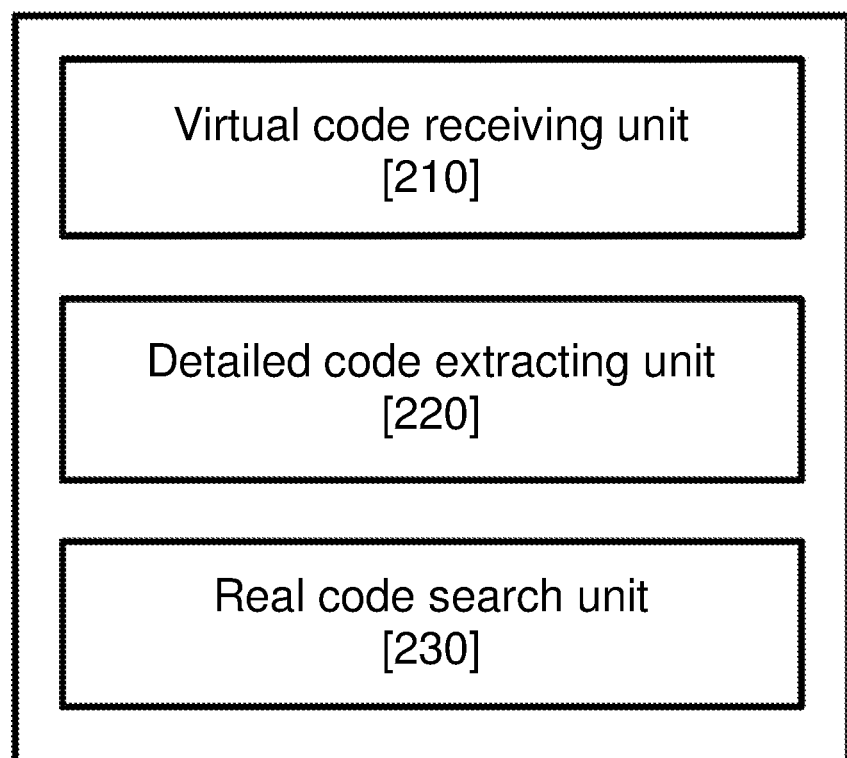
FIGS. 3 and 4 are block diagrams illustrating a configuration of a virtual code verifying device according to embodiments of the inventive concept.

The virtual code providing unit 130 may play a role in outputting the virtual code to the outside to provide the virtual code to a virtual code verifying device 200 of FIG. 3. The virtual code providing unit 130 may include a variety of elements which may provide the virtual code to the outside. The virtual code providing unit 130 may include all or some of a wireless communication module, a short range communication module, an integrated circuit (IC) chip, a magnetic field generating unit, a display, and the like.

The wireless communication module may refer to a module for accessing wireless Internet and may be internally or externally mounted on a mobile terminal. Wireless local area network (LAN) (wireless-fidelity (Wi-Fi)), wireless broadband (Wibro), world interoperability for microwave access (Wimax), high speed downlink packet access (HSDPA), long term evolution (LTE), LTE-advanced (LTE-A), or the like may be used as wireless Internet technology.

The short range communication module may refer to a module for short range communication. Bluetooth, Bluetooth low energy (BLE), beacon, radio frequency identification (RFID), near field communication (NFC), infrared data association (IrDA), ultra wideband (UWB), Zigbee, or the like may be used as short range communication technology.

If the virtual code generating device 100 corresponds to a card which transmits a virtual code (i.e., a virtual card number) to a POS device, the virtual code providing unit 130 may include the magnetic field generating unit or the IC chip. The magnetic field generating unit may perform a function of outputting card data in the form of a magnetic signal to transmit the card data to a card reader. The magnetic field generating unit may include one or more magnetic cells which forms a magnetic field through a current flow and outputs a card information magnetic signal. The magnetic field generating unit may be provided to be exposed to an upper surface or a lower surface of a printed circuit board (PBC) along a specific long side to be adjacent to the specific long side of the PCB of a card.

The IC chip may be mounted on the PCB and may be in contact with a port of an IC-type card reader to exchange data. In other words, the IC chip may transmit a virtual code generated by the virtual code generating unit 120 to the IC-type card reader.

The display unit may include at least one of a liquid crystal display, a thin film transistor-liquid crystal display, an organic light-emitting diode, a flexible display, and an electronic paper (E-paper).

The display unit may visually output a virtual code generated by the virtual code generating unit 120 to the outside. Thus, a user of the virtual code generating device 100 may visually verify a virtual code generated in real time and may directly input the visually verified virtual code to the virtual code verifying means 20.

Further, the user may send the virtual code displayed on the display unit through various paths such as a text message. Since the user transmits the virtual code (specifically, a continuously changed and generated code) for searching for a real code at the virtual code verifying means 20 rather than transmitting a real code, he or she may fail to worry about hacking of the real code when transmitting a code through a text message or the like.

FIG. 3 is a block diagram illustrating a configuration of a virtual code verifying device 200 according to embodiments of the inventive concept.

Referring to FIG. 3, the virtual code verifying device 200 according to an embodiment of the inventive concept may include a virtual code receiving unit 210, a detailed code extracting unit 220, and a real code search unit 230. The virtual code verifying device 200 may be an electronic device or a server device. For example, the virtual code verifying device 200 may correspond to an Internet of things (IOT) device connected with a control device (i.e., a virtual code generating device 100 of FIG. 2) which generates and transmits a virtual code with which a real code is replaced. The IOT device may search for a storage location of a real code based on a virtual code and may be driven if the real code is extracted from a specific storage location.

Further, for example, the virtual code verifying device 200 may be a card issuer server which receives a virtual card number for a specific type of a card of a specific card issuer, possessed by a specific user, searches for a real card number, and proceeds with payment. In detail, in case of card payment, the virtual code verifying device 200 may receive a virtual code, generated by the virtual code generating device 100, via a POS device and a PG server.

The virtual code receiving unit 210 may play a role in receiving the virtual code from the virtual code generating device 100. As an embodiment, the virtual code receiving unit 210 may include a wireless communication unit (e.g., a wireless communication module or a short range communication module) and may receive the virtual code through wireless communication from the virtual code generating device 100. Further, as another embodiment, the virtual code receiving unit 210 may receive the virtual code, generated by the virtual code generating device 100, through communication with another server.

Further, as another embodiment, the virtual code receiving unit 210 may be a user input unit. In other words, the virtual code receiving unit 210 may directly receive the virtual code, visually output on the virtual code generating device 100, from a user. For example, if the virtual code generating device 100 is a device (e.g., a smart card) which generates a virtual card number and outputs the virtual card number on a card surface, the user may verify a virtual code visually displayed on the virtual code generating device 100 and may directly input the virtual code to a user input unit of the virtual code verifying device 200.

In detail, the virtual code generating device 100 may have a display unit in changeable digits (e.g., digits except for the first 6 digits and the last digit for determining a card issuer and a card type) among 16 digits of a card number. If a virtual code is generated, the virtual code generating device 100 may output a character on changeable digits of the virtual code. The user may input both of a code which is not changed and a changed code as a virtual code to the user input unit (i.e., the virtual code receiving unit 210) of the virtual code verifying device 200.

The detailed code extracting unit 220 may extract a plurality of detailed codes included in the virtual code. The virtual code may be generated by combining the plurality of detailed codes according to a specific rule. The detailed code extracting unit 220 of the virtual code verifying device 200 may include the same detailed code combination function as the virtual code generating device 100 of a specific group. The detailed code extracting unit 220 may extract the plurality of detailed codes from the virtual code by applying the detailed code combination function. For example, if the virtual code generating device 100 generates a virtual code in which two detailed codes (i.e., a first code and a second code) are combined, the detailed code extracting unit 220 may extract the first code and the second code from a string of the virtual code by applying the detailed code combination function.

The real code search unit 230 may search for a storage location of a real code based on the plurality of detailed codes. A variety of manners may be applied to the manner of searching for the storage location of the real code based on each of the plurality of detailed codes at the real code search unit 230. The real code search unit 230 may include correlation between the plurality of detailed codes to search for a storage location based on the plurality of detailed codes.

If the virtual code is configured with the first code and the second code, as an embodiment having correlation between the plurality of detailed codes, the real code search unit 230 may determine a search start point corresponding to the first code and may search for a point moved along a search path corresponding to the second code from the search start point as a storage location of a real code. In other words, the detailed code may include the first code for setting a start point for searching for a storage location and the second code for setting a search path from the start point to the storage location according to a specific search scheme.

Further, as another embodiment, as a virtual code generating means 10 of FIG. 1 (or the virtual code generating device 100) provides a new virtual code per unit count, the virtual code verifying device 200 may change the first code and the second code for searching for a storage location whenever a unit count elapses. The virtual code verifying device 200 may set a search start point and a search path based on the first code and the second code changed for each count and may search for a storage location of a real code.

Further, as another embodiment, the real code search unit 230 may include a storage location search algorithm to search for a storage location of a real code using the plurality of detailed code having correlation. The storage location search algorithm may be an algorithm for searching for a storage location when each of the plurality of detailed codes included in the virtual code is applied. For example, if including a first code for determining a start point for searching for a storage location from a virtual code and a second code for providing a direction of the storage location from the start point, the storage location search algorithm may be an algorithm of adjusting to arrange a storage location to which a real code is matched in a corresponding location when indicating a direction corresponding to the second code at a point corresponding to the first code. As the storage location search algorithm is used, the virtual code verifying device 200 may search for the storage location of the real code or a point matched to the storage location although the first code and the second code included in the virtual code are changed. Various manners may be applied to the storage location search algorithm. A description will be given in detail of the storage location search algorithm. Herein, the storage location search algorithm is not limited to an example described below.

For example, as will be described below, if the storage location search algorithm is a k-gon (k is $M^N$) which performs rolling motion along a track in which MN codes corresponding to the first code are sorted and if a vertex of the k-gon is moved to correspond to a point where the code is located on a first code track, each vertex of the k-gon may be matched to a storage location of a real code and a point where the first code track (i.e., a first track) corresponds to the k-gon may be a search start point of a storage location corresponding to the first code. In this case, the real code search unit 230 may apply the k-gon to rolling motion such that the vertex of the k-gon is adjacent to a point corresponding to the first code extracted by the detailed code extracting unit 220. Thus, as it is indicated at an angle corresponding to the second code in a location on the first track to which the k-gon is adjacent (e.g., a specific angle for dividing 180 degrees into $M^N$ portions to face the vertex of the k-gon), the real code search unit 230 may search for a vertex of the k-gon, which is a storage location where a real code corresponding to a virtual code is stored.

Figure 6:
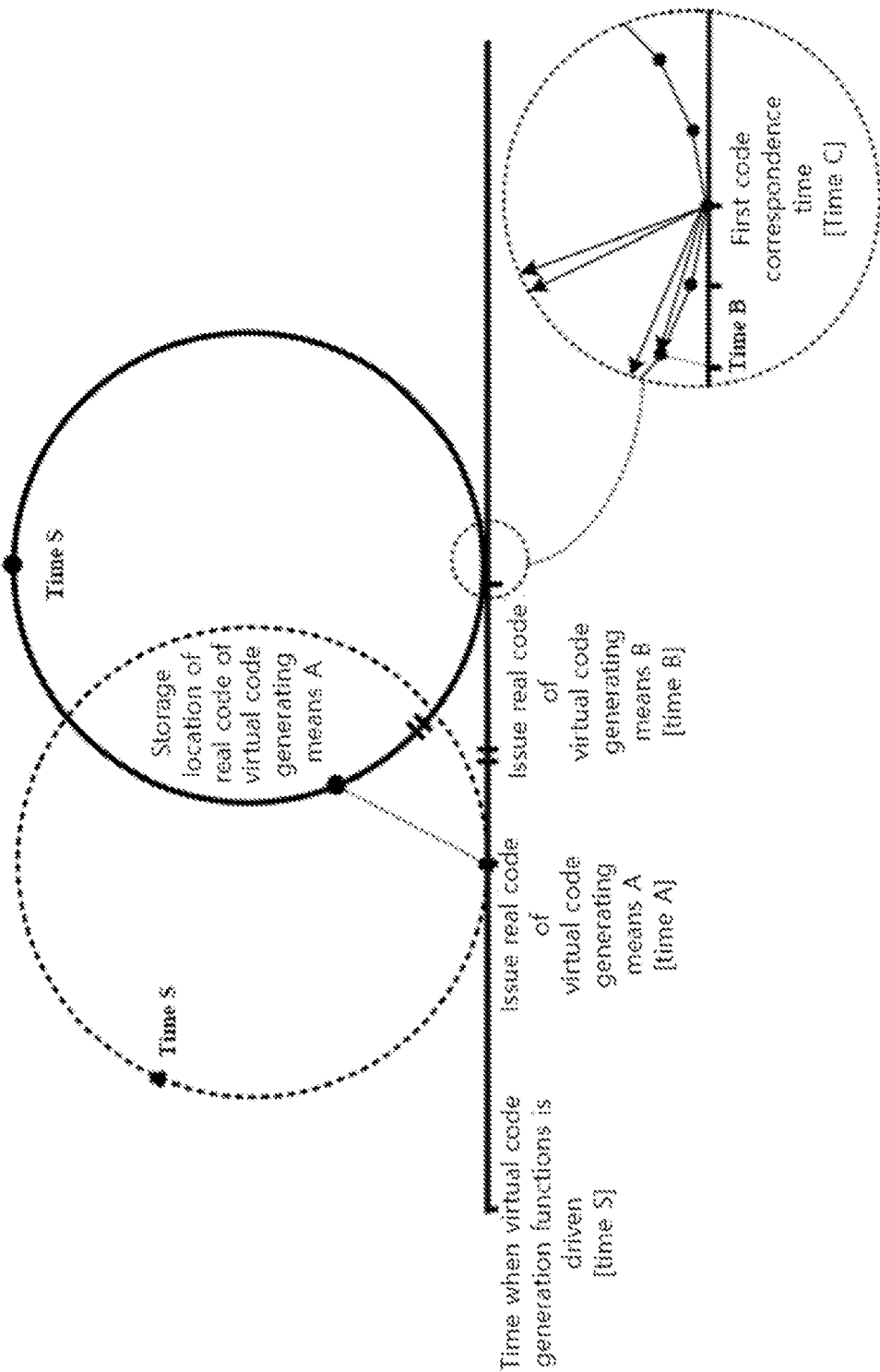
FIG. 6 is a drawing illustrating a storage location search algorithm for searching for a storage location of a real code through rolling motion of a k-gon according to an embodiment of the inventive concept.

In detail, as shown in FIG. 6, the virtual code verifying device 200 may perform rolling motion of the k-gon to a point corresponding to the first code (i.e., move the k-gon such that each vertex of the k-gon is adjacent to each point on a track in turn). Thereafter, the virtual code verifying device 200 may indicate an angle direction corresponding to the second code and may search for a vertex corresponding to a storage location. For example, since 2 counts elapse after a real code is issued, a virtual code generating means B may generate a second code to which the 2 counts are applied as a function value and may provide the generated second code to a virtual code verifying means. Since the virtual code verifying means may match and store a second code generated by a second function for each count to an angle which faces each vertex from a point where the k-gon and a track are adjacent to each other (i.e., match and store the second code to which n counts are applied to an angle which faces an $n^{th}$ vertex which performs rolling motion as the rolling motion is performed by the n counts of the k-gon), it may search for a vertex of the k-gon, corresponding to a storage location of a real code by applying an angle corresponding to the second code to a first code correspondence point.

Figure 4:
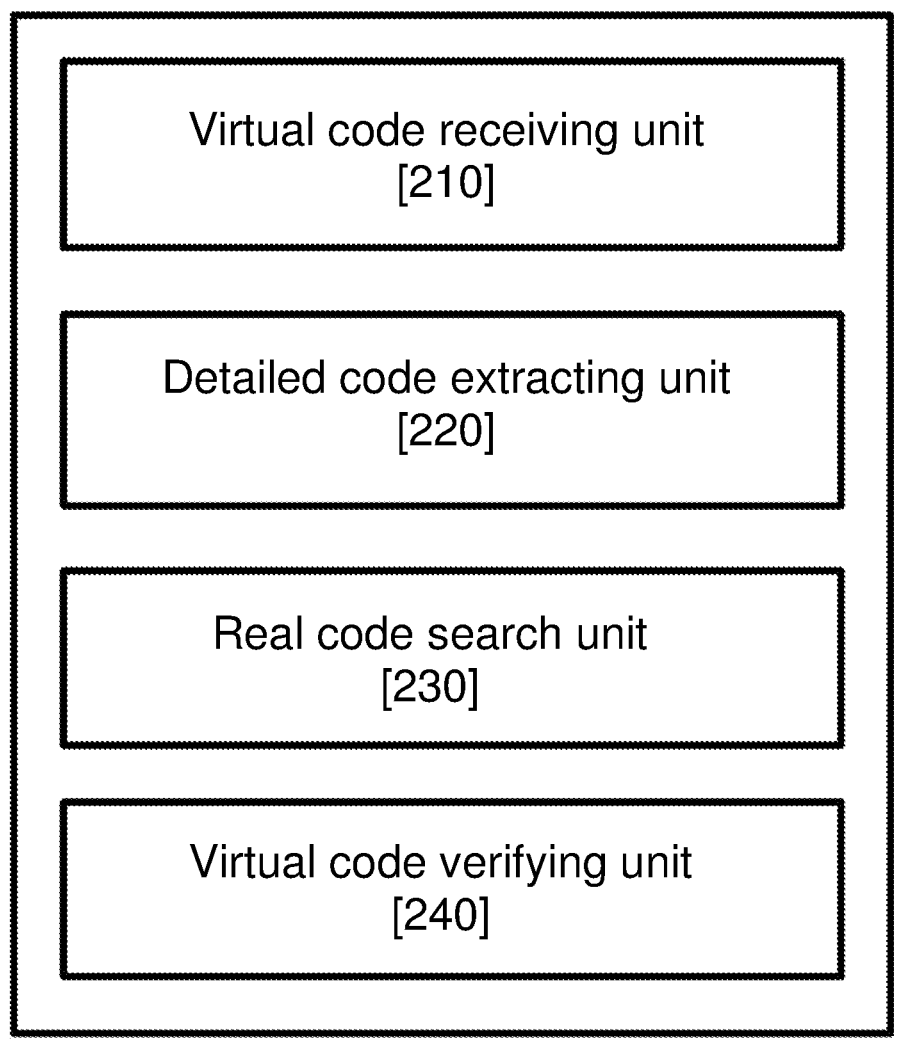

Further, as another embodiment, as shown in FIG. 4, the virtual code generating device 200 may further include a virtual code verifying unit 240. The virtual code verifying unit 240 may play a role in determining whether a virtual code received by the virtual code verifying device 200 is true.

Figure 5:
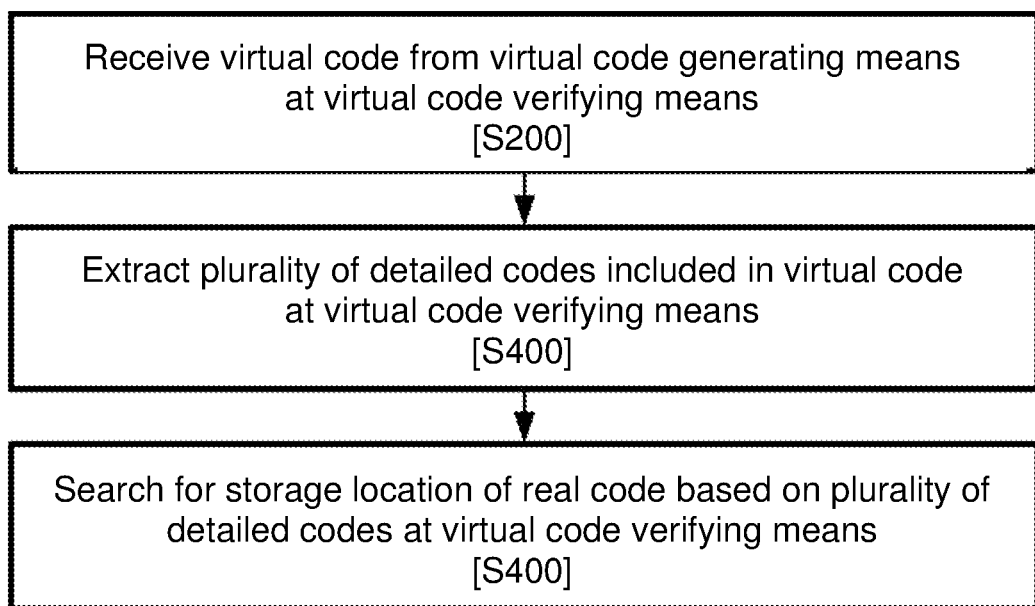
FIG. 5 is a flowchart illustrating a method for providing a virtual code according to an embodiment of the inventive concept.
Figure 7:
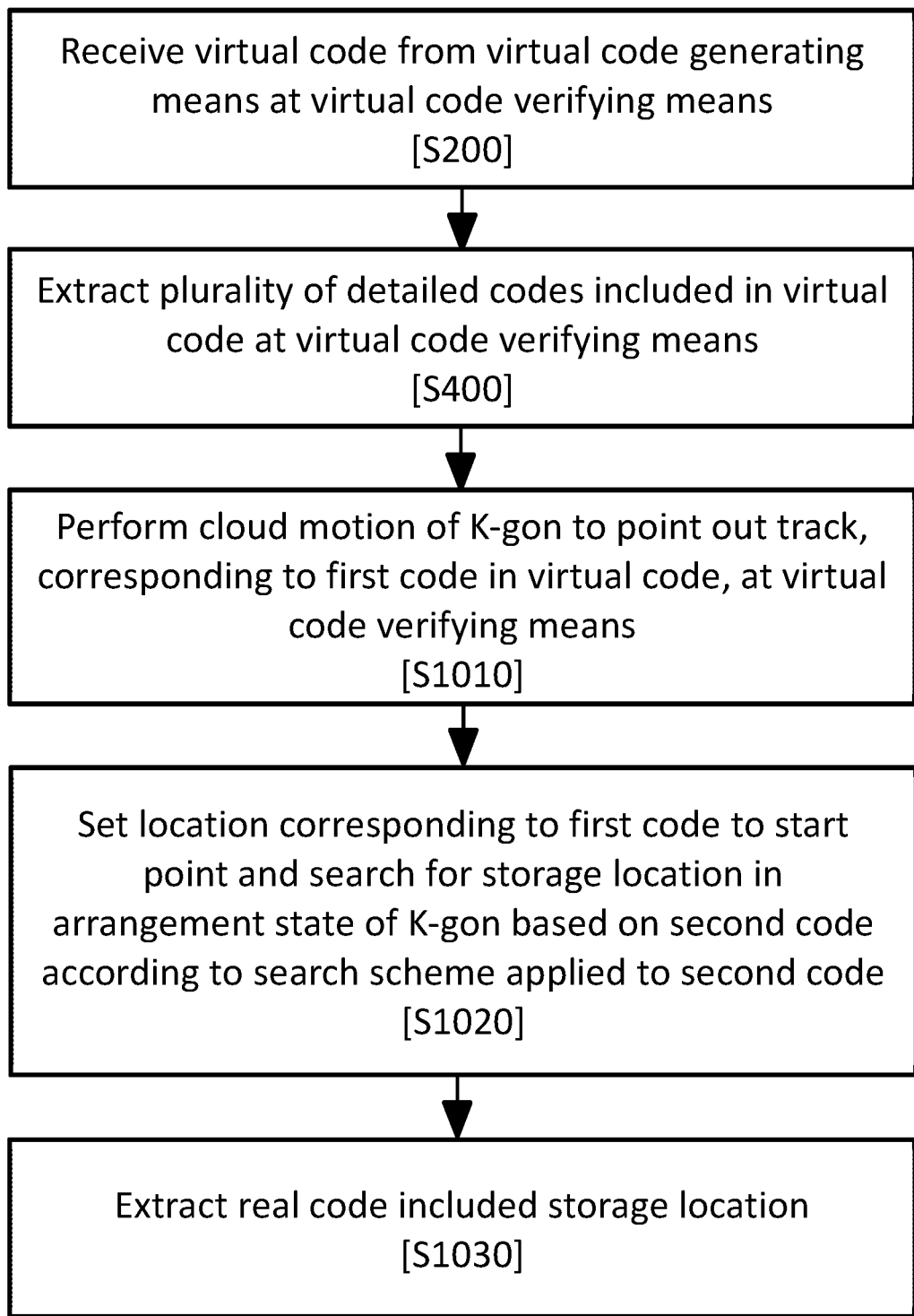
FIG. 7 is a flowchart illustrating a method for providing a virtual code, including a real code search process according to rolling motion of a k-gon, according to an embodiment of the inventive concept.
Figure 8:
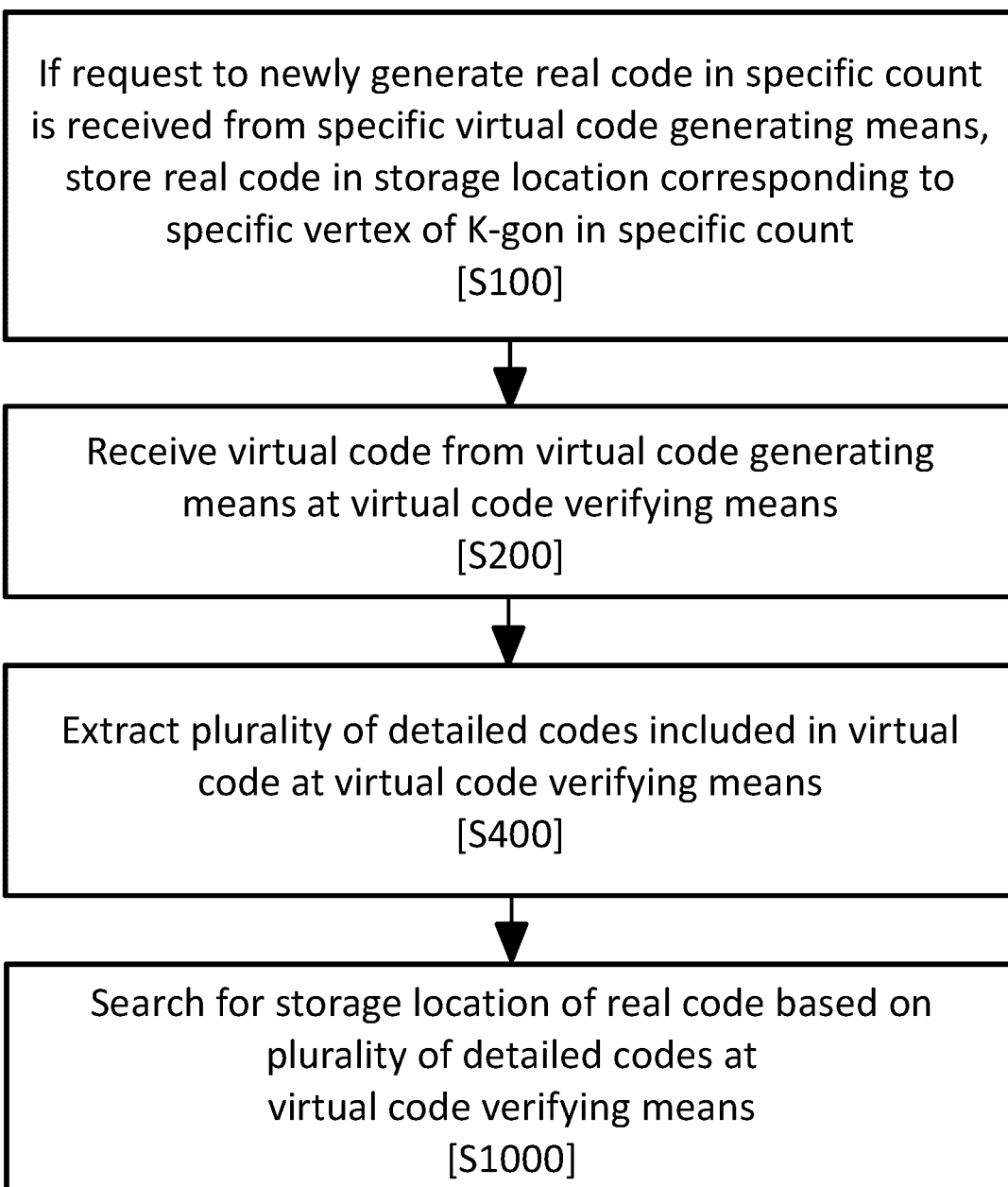
FIG. 8 is a flowchart illustrating a method for providing a virtual code, further including a process of issuing a real code and storing the real code in a storage location, according to an embodiment of the inventive concept.
Figure 9:
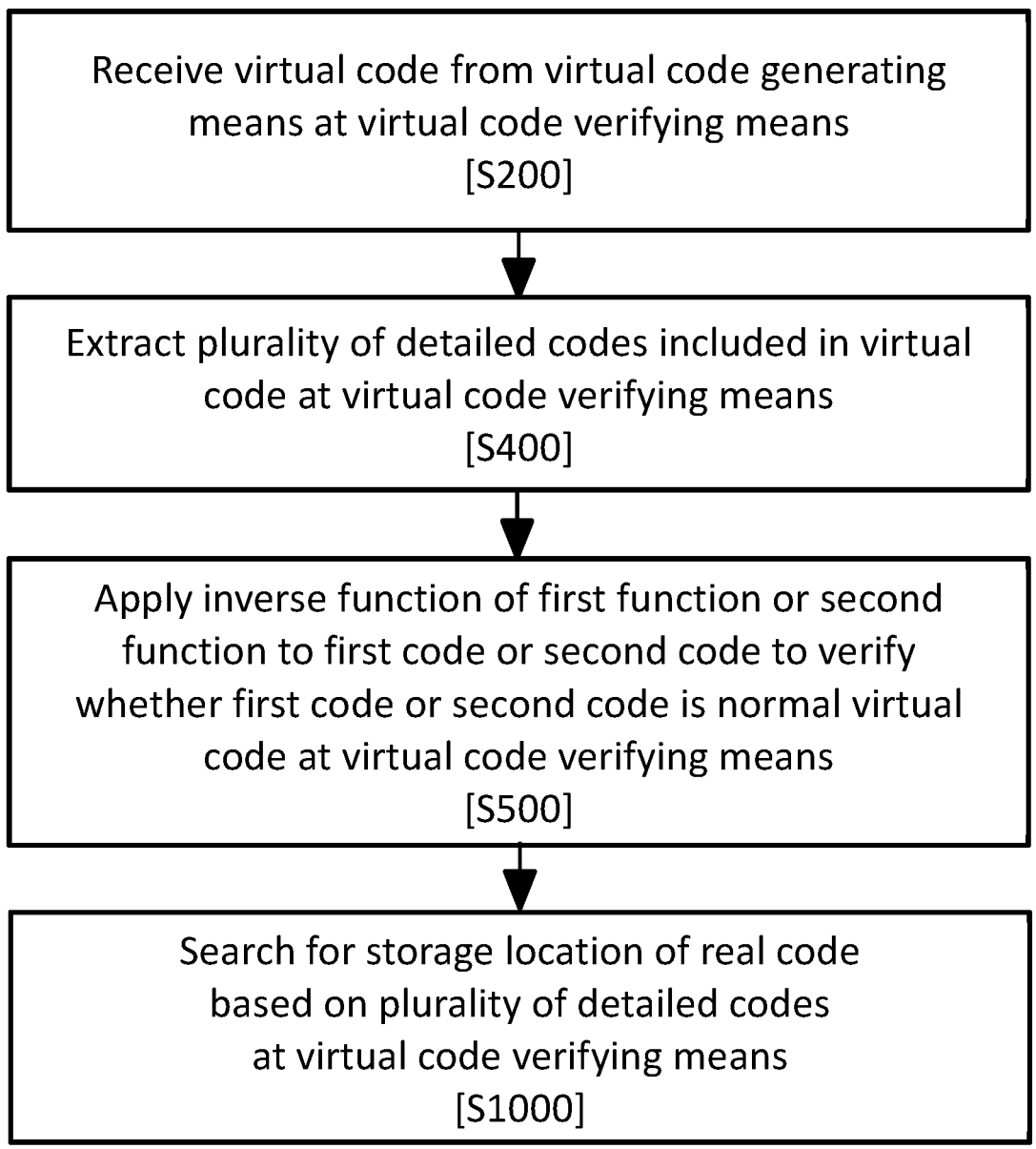
FIG. 9 is a flowchart illustrating a method for providing a virtual code, further including a virtual cod verifying process, according to an embodiment of the inventive concept.
Figure 10:
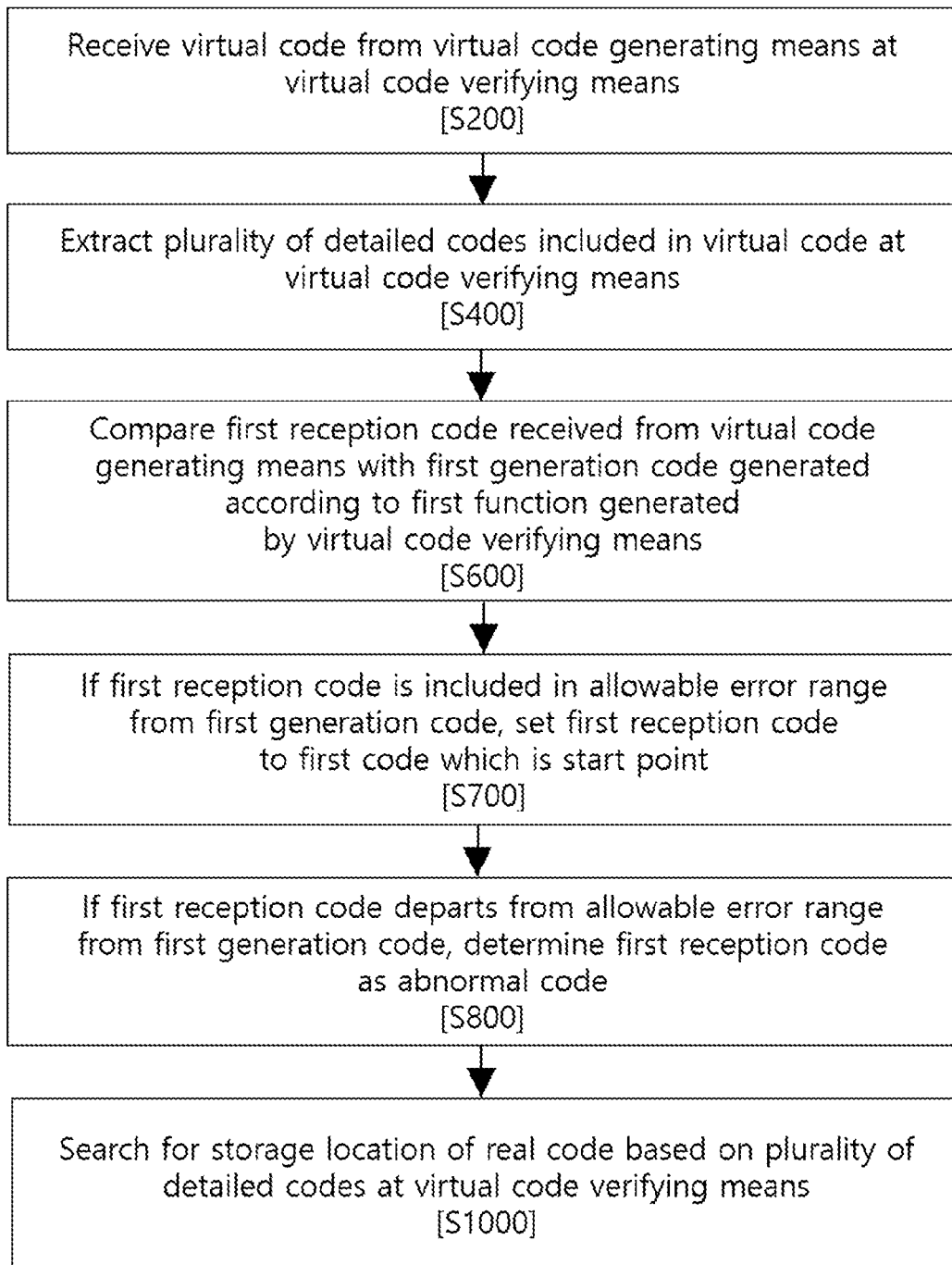
FIG. 10 is a flowchart illustrating a method for providing a virtual code, further including a process of determining whether a virtual code is an abnormal code, according to an embodiment of the inventive concept.

FIG. 5 is a flowchart illustrating a method for generating a virtual code according to an embodiment of the inventive concept. FIG. 6 is a drawing illustrating a storage location search algorithm for searching for a storage location of a real code through rolling motion of a k-gon according to an embodiment of the inventive concept. FIG. 7 is a flowchart illustrating a method for providing a virtual code, including a real code search process according to rolling motion of a k-gon, according to an embodiment of the inventive concept. FIG. 8 is a flowchart illustrating a method for providing a virtual code, further including a process of issuing a real code and storing the real code in a storage location, according to an embodiment of the inventive concept. FIG. 9 is a flowchart illustrating a method for providing a virtual code, further including a virtual code verifying process, according to an embodiment of the inventive concept. FIG. 10 is a flowchart illustrating a method for providing a virtual code, further including a process of determining whether a virtual code is an abnormal code, according to an embodiment of the inventive concept.

Referring to FIG. 5, the method for providing the virtual code according to an embodiment of the inventive concept may include receiving (S200), by a virtual code verifying means 20 of FIG. 1, the virtual code from a virtual code generating means 10 of FIG. 1, extracting (S400), by the virtual code verifying means 20, a plurality of detailed codes included in the virtual code, and searching for (S1000), by the virtual code verifying means 20, a storage location of a real code based on the plurality of detailed codes. Hereinafter, a description will be given in detail of each operation. Herein, a detailed description of the detailed contents in a process of describing a virtual code generating device 100 of FIG. 2 and a virtual code verifying device 200 of FIG. 3 or 4 will be omitted.

In operation S200, the virtual code verifying means 20 may receive the virtual code from the virtual code generating means 10. The virtual code may be generated by the virtual code generating device 100 (or the virtual code generating means 10) and may be provided to the virtual code verifying means 20.

The virtual code generated by the virtual code generating means 10 may be configured with the plurality of detailed codes. As embodiment, the virtual code may be generated by a combination of a first code and a second code. Each of the first code and the second code may be used to search for a location of a real code at the virtual code verifying means 20. For example, the first code may be a code for setting a start point for searching for a storage location of a real code, and the second code may be a code for setting a search path from the start point to the storage location according to a specific search scheme.

The search scheme may be determined by a storage location search algorithm. A detailed description for determining the search scheme will be given in operation S1000 described below.

Further, as another embodiment, if the first code or the second code of N digits is generated with M characters, a virtual code generation function may include a first function or a second function for providing different $M^N$ codes as the first code or the second code sequentially changed per unit count. In other words, the first function or the second function may be a function of generating the $M^N$ codes not to be duplicated as a count is increased and may be to generate a specific one of the $M^N$ codes as the first code or the second code in a count corresponding to a specific time. Thus, the virtual code generating means 10 may fail to duplicate and generate the same first or second code within $M^N$ counts (i.e., a time length corresponding to the $M^N$ counters) and may generate a new detailed code (i.e., the first code and the second code) per unit count to generate a new virtual code per unit count.

In detail, if $M^N$ codes are used as the first code or the second code as the first code or the second code of the N digits is generated using the M characters, the virtual code generation function may be to match each code for each count from an initial time when a detailed code generation function is driven. For example, if a unit count is set to 1 second, the virtual code generation function may be to match different $M^N$ codes every second from a time when the detailed code generation function is initially driven. If a period when a specific detailed code generation function is used or a use period of the virtual code generating device 100 (e.g., an expiration date of a smart card which generates a virtual card number) is set to a time length which is shorter than a time length (e.g., $M^N$ seconds if 1 count is 1 second) corresponding to $M^N$ counts, the same code of the first code or the second code may fail to be duplicated and generated during the use period. In other words, when a count is increased over time, if a user requests the virtual code generating device 100 to generate a virtual code at a specific time, the virtual code generating device 100 may generate a code value matched to a count corresponding to the specific time as the first code or the second code.

Further, as another embodiment, any one of the first code or the second code included in the virtual code may be generated by reflecting a value (i.e., a device identification value) which differently exist always at the same time at each of the plurality of virtual code generation devices 100, such that the same virtual code is not generated at the same time between users who belong to the same group. In other words, if it is requested to issue a virtual code at the plurality of virtual code generating means 10 which belong to one group at a specific time, each of the plurality of virtual code generating means 10 may generate a different first or second code by reflecting a value differently assigned to each of the plurality of virtual code generating means 10 at each time to generate a different virtual code.

For example, the device identification value may be a time (or a count number) which elapses from a start time when the specific virtual code generating device 100 is included in a group to which a specific detailed code generation function is applied (e.g., a time started to apply the detailed code generation function to the specific virtual code generating device 100 after a specific time elapses from an initial time when the specific detailed code generation function in the virtual code verifying means 20 is driven) to a current time. If the plurality of virtual code generating devices 100 are included in one group and if counts set such that the plurality of virtual code generating devices 100 belong to the group are not identical to each other (i.e., if the plurality of virtual code generating devices 100 fail to be registered in the group at the same time), a time which elapses from a time (or count) when the virtual code generating device 100 belongs to the group to a specific time may vary for each virtual code generating device 100. For example, if a request to participate in a group is simultaneously received from the plurality of virtual code generating means (e.g., if a request to issue a specific type of a card of a specific card issuer is received), the virtual code verifying means 20 may assign an order to the request to participate in the group, simultaneously received from the plurality of virtual code generating means 10, according to a predetermined condition to process the request as a request received in another count.

For example, if the virtual code is generated by a combination of the first code and the second code, the virtual code generation function may be generated the second code based on a unit count which elapses from a time when a real code is newly generated.

Thus, as at least any one of detailed code generation functions uses the time, which elapses from a time (or count) when the virtual code generating device 100 belongs to a group to the specific time, as a device identification value, such that a virtual code generated by each of the plurality of virtual code generating devices 100 varies always for each time. Thus, the virtual code generating means 10 may be distinguished by receiving the virtual code at the virtual code verifying means 20 rather than separately receiving data for identifying a user.

Since a time length of a time which elapses a time when the specific virtual code generating device 100 belongs to a specific group continue increasing over time, a detailed code (e.g., the second code) generated by the specific virtual code generating device 100 may be continuously generated as a different value without being generated as the same value.

Further, as another embodiment, the first code may be set to a code value corresponding to a time (or count) which is requested to generate the virtual code among codes matched for each count from an initial time when a first function is driven, and the second code may be set to a code value generated by reflecting a value (i.e., a device identification value) which differently exists always at the same time for each virtual code generating device 100, such that a duplicated virtual code is not generated irrespective of a user in the entire period. The virtual code may be used as a code value in which the first code and the second code are combined. Since the first code has a different code value for each count and since the second code has a different code value for each virtual code generating device 100 at the same time, the virtual code in which the first code and the second code are combined may be output as different code values irrespective of the virtual code generating devices 100 and a time.

Further, as another embodiment, the virtual code generation function may include a detailed code combination function corresponding to a rule of sorting a plurality of detailed codes. In other words, the virtual code generation function may have a specific rule of sorting or arranging characters included in the plurality of detailed codes. Thus, in case of the virtual code generating means 10 and the virtual code verifying means 20 which include the same virtual code generation function, the virtual code generating means 10 may sort characters included in the plurality of detailed codes according to the detailed code combination function and the virtual code verifying means 20 may separate a separate detailed code from a virtual code using the same detailed code combination function.

Further, as another embodiment, any one of a plurality of sorting rules of sorting M characters in an ascending order may be applied to the virtual code generation function. In other words, various sorting rules of sorting the M characters in the ascending order may be applied to the virtual code generation function. The virtual code generation function may be classified as a different virtual code generation function according to the applied sorting rule.

The virtual code verifying means 20 may receive the virtual code generated by the virtual code generating means 10 in various manners. In other words, the above-mentioned various manners of providing the virtual code at the virtual code generating device 100 may be applied to the virtual code verifying means 20.

In operation S400, the virtual code verifying means 20 may extract the plurality of detailed codes included in the virtual code. As the virtual code verifying means 20 includes a virtual code generation function included in the virtual code generating means 10, it may extract the plurality of detailed codes by applying a rule (i.e., a detailed code combination function) which combines the plurality of detailed codes in the same manner. In other words, the detailed code combination function may correspond to a rule of sorting the plurality of detailed codes and may be included in a virtual code generation function.

Further, as another embodiment, if the virtual code includes a fixed code for determining a group which includes the virtual code generating means 10, operation S400 may include extracting the fixed code from the virtual code, determining the group of the virtual code generating means 10 based on the fixed code, and determining the virtual code generation function or the storage location search algorithm for the group. In other words, if a virtual code generation function or a storage location search algorithm is applied in a different way for each group, the virtual code verifying means 20 may distinguish a group based on the fixed code in the virtual code.

Further, the process of determining the virtual code generation function using the fixed code may be performed before a process of extracting the plurality of detailed codes. Since a detailed code combination function included in the virtual code generation function is determined after the virtual code generation function is determined by the fixed code, the plurality of detailed codes may be extracted.

For this purpose, the fixed code may be combined to a fixed location in the virtual code (e.g., a specific number of foremost digits of the virtual code) to easily separate the fixed code without a separate function.

In operation S1000, the virtual code verifying means 20 may search for a storage location of a real code based on the plurality of detailed codes. The plurality of detailed codes may have correction therebetween. The virtual code verifying means 20 may search for the storage location of the real code based on the correlation between the plurality of detailed codes.

Further, as an embodiment, a code generated per unit count in the plurality of detailed codes in the virtual code may be changed (e.g., if the virtual code is configured with two detailed codes, a first code and a second code may be changed per unit count). The virtual code verifying means 20 may adjust a point matched to the storage location of the real code as a location matched with the changed first and second codes per unit count to search for the storage location of the real code although the virtual code is changed.

As an embodiment about the correlation between the detailed codes configuring the virtual code, if the virtual code is configured by a combination of the first code and the second code, the virtual code verifying means 20 may search for a storage location by setting the first code to a search start point (i.e., a point started to search for the storage location of the real code) and applying the second code to a path moved from the search start point to the storage location. In other words, if a virtual code normally generated per unit count is received, the virtual code verifying means 20 may determine a search point moved along the search path corresponding to the second code from a start point corresponding to the first code as the storage location of the real code or a point matched to the storage location (e.g., a storage space matched to a search point in a separate server).

As an embodiment, if the second code include all of information about a path from a search start point corresponding to the first code to a storage location, the virtual code verifying means 20 may search for the storage location of the real code or the point matched to the storage location along a search path corresponding to the second code from the search start point corresponding to the first code.

As another embodiment, the virtual code verifying means 20 may include a storage location search algorithm of adjusting the storage location of the real code to be matched with the virtual code per unit count. In other words, the virtual code verifying means 20 may include the storage location search algorithm of adjusting a search path to a point matched to the storage location of the real code per unit count. If the first code and the second code are changed per unit count, the virtual code verifying means 20 may adjust the storage location search algorithm to be matched with the changed first and second codes. The storage location search algorithm may be implemented in various forms.

As an embodiment, as shown in FIG. 7, rolling motion of k-gon may be performed in the storage location search algorithm such that a vertex of the k-gon corresponds to a point where each code is located on a track where k (k is $M^N$) codes are sorted. In this case, operation S1000 may include performing (S1010) rolling motion of the k-gon to a point on a track, corresponding to a first code in the virtual code received from the virtual code generating means 10, setting (S1020) a location corresponding to the first code to a start point and searching for a storage location in an arrangement state of the k-gon or a point to which the storage location is matched, based on the second code according to a search scheme applied to the second code, and extracting (S1030) the real code included in the storage location.

As shown in FIG. 6, in operation S1010, the virtual code verifying means 20 may perform the rolling motion of the k-gon to the point on the track, corresponding to the first code in the virtual code received from the virtual code generating means 10. The storage location search algorithm may be the k-gon (k is $M^N$) which performs rolling motion along a track where $M^N$ codes corresponding to the first code are sorted, and a vertex of the k-gon may move to correspond to a point where a code is located on a first code track. In this case, the virtual code verifying means 20 may apply the k-gon to rolling motion such that a vertex of the k-gon is adjacent to the point corresponding to the first code.

As shown in FIG. 6, in operation S1020, the virtual code verifying means 20 may set the location corresponding to the first code to the start point and may search for a storage location in an arrangement state of the k-gon or a point matched to the storage location (i.e., a specific vertex of the k-gon) based on the second code according to a search scheme applied to the second code. The storage location may be matched to each vertex of the k-gon. A point where a first code track (i.e., a first track) and the k-gon correspond to each other may be a start point for searching for a storage location corresponding to the first code. The virtual code verifying means 20 may search for a matching point of a storage location based on the second code from the search start point.

Various manners may be applied to the manner of searching for the storage location from the k-gon based on the second code. For example, as it is indicated at an angle corresponding to the second code in a location on the first track to which the k-gon is adjacent (e.g., a specific angle for dividing 180 degrees into $M^N$ portions to face a vertex of the k-gon), the virtual code verifying means 20 may search for the vertex of the k-gon, which is a storage location where the real code corresponding to the virtual code is stored.

Further, as another example, in a state where the k-gon is adjacent to a point corresponding to the first code on the first track, the virtual code verifying means 20 may divide the entire central angle (i.e., 360 degrees) into $M^N$ angles with respect to the center of the k-gon and a contact point on the first track and may match each angle to $M^N$ second codes. A direction of a line of moving a specific number of unit angles (i.e., 360 degrees/$M^N$) from a line of connecting the center of the k-gon with the contact point on the first track may be a specific vertex of the k-gon. Thus, if the second code corresponding to a specific angle is received, the virtual code verifying means 20 may search for a vertex located in an angle direction.

Further, as another example, a specific digit of the second code may be used to determine an angle calculation direction. In other words, if the second code is generated using N (N is a natural number) characters, an angle measurement direction may be determined as one digit. For example, the virtual code verifying means 20 may divide the entire central angle (i.e., 360 degrees) with respect to the center of the k-gon and the contact point on the first track. If the second code is matched to each code, the virtual code verifying means 20 may determine whether an angle is an angle measured in a left direction or a right direction from the line of connecting the center of the k-gon with the contact point on the first track as a value of one digit.

For example, the storage location search algorithm may arrange two different second codes to one of vertices on the k-gon according to the angle measurement direction. In other words, when reaching one vertex at an internal angle and at an external angle, a different second code may be matched to one vertex and a different real code may be connected to the one vertex. For another example, if the second code is generated using N (N is a natural number) characters, the storage location search algorithm may match the second code to half the entire angle (e.g., 360 degrees if it is divided with respect to a central angle) using N-1 characters and may determine an angle application direction for reaching each vertex using one digit.

The manner of searching for the storage location from the k-gon based on the second code is not limited thereto. Various manners, such as a manner of searching for a point where a point on the k-gon, corresponding to the second code, and a contact point on the first track are divided at a specific rate as a storage location, may be applied.

In operation S1030, the virtual code verifying means 20 may extract the real code included in the storage location. In other words, the virtual code verifying means 20 may search for a storage location corresponding to a vertex of the k-gon and may extract the real code in the storage location.

Further, as shown in FIG. 8, as another embodiment, the method for providing the virtual code according to an embodiment of the inventive concept may further include, if a request to newly generate a real code in a specific count is received from the specific virtual code generating means 10, storing (S100) the real code in a storage location corresponding to a specific vertex of a k-gon in the specific count. The specific vertex may be a point where a track and the k-gon are met in the specific count. When a specific time (or count) elapses after the virtual code verifying means 20 drives a virtual code generation function and a storage location search algorithm, as a request to issue a new real code (i.e., a request to be included in a specific group) is received from the specific virtual code generating means 10, the virtual code verifying means 20 may store the newly generated real code in a storage location matched to a vertex of the k-gon which is adjacent to a first track. In detail, rolling motion of the k-gon may be performed to move a location where the k-gon and a track are adjacent to each other by one code for each count as the virtual code generation function and the storage location search algorithm are driven at the virtual code verifying means 20. If a request to issue a new real code in a specific count is received, a vertex which is adjacent to a track in the specific count may be determined as a point on the k-gon, in which the real code is stored.

For example, as shown in FIG. 6, as a real code for a virtual code generating means A is issued at time A, the virtual code verifying means 20 may store the real code of the virtual code generating means A in a vertex of the k-gon adjacent to a track at time A. Thereafter, if a count elapses, rolling motion of the k-gon may be performed along the track. A storage location where the real code of the virtual code generating means A is stored may rotate by rotation of the k-gon.

In other words, after the real code is stored in a vertex of the k-gon adjacent to the track, the k-gon may rotate as much as n counts elapse and a point where the real code is stored may rotate by the number of the n counter which elapse. Thus, if a second code is calculated by reflecting the number of unit counts which elapse from a count (i.e., time) where a real code is issued, the virtual code verifying means 20 may calculate a point on the k-gon, where the real code is stored, at a time when a virtual code is generated, through the second code.

In detail, if the first code has a code value corresponding to the number of counts which elapse from an initial time when a specific virtual code generation function and a specific storage location search algorithm are driven in the virtual code verifying means 20 and if the second code value has a code value corresponding to the number of counts which elapse after a real code is issued to the specific virtual code generating means 10, the virtual code verifying means 20 may determine a time (i.e., time C) requested to generate a virtual code at the virtual code generating means 20 through the first code and may determine a vertex on the k-gon, where a real code is stored in an arrangement state of the k-gon of the time through the second code. In other words, the first code may be used to determine a point on a track to be in the arrangement state of the k-gon for searching for a specific vertex of the k-gon, and the second code may be used to search for a vertex on the k-gon, which is matched to a storage location of a real code after the k-gon is arranged at a point on a track corresponding to the first code. Therefore, although there is a delay time when a virtual code is provided to the virtual code verifying means 20 after the virtual code is generated at the virtual code generating means 10, the virtual code verifying means 20 may accurately search for the real code corresponding to the virtual code.

Further, as another embodiment, as shown in FIG. 9, the method for providing the virtual code according to an embodiment of the inventive concept may further include applying (S500) an inverse function of the first function or the second function to the first code or the second code to verify whether the first code or the second code corresponds to a normally generated virtual code. For example, if the first code has a code value corresponding to the number of counts which elapses from an initial time when a specific virtual code generation function and a specific storage location search algorithm are driven in the virtual code verifying means 20 and if the second code has a code value corresponding to the number of counts which elapses after a real code is issued to the specific virtual code generating means 10, the virtual code verifying means 20 may store a time Ts together, which elapses until the real code is issued after the virtual code generation function is driven, when the real code is stored in a storage location. The virtual code verifying means 20 may apply the inverse function of the first function to the first code in a virtual code to calculate an elapsed time T1 until the virtual code is generated from a time when the virtual code generation function is driven and may apply the inverse function of the second function to the second code in the virtual code to calculate an elapsed time T2 until the virtual code is generated from a time when the real code is issued. Thereafter, the virtual code verifying means 20 may determine whether a difference between the elapsed time T and the elapsed time T2 corresponds to the time Ts to verify the virtual code.

Further, as another embodiment, as shown in FIG. 10, the method for providing the virtual code according to an embodiment of the inventive concept may further include comparing (S600) a first reception code received from the virtual code generating means 10 with a first generation code generated according to a first function generated at the virtual code verifying means 20, if the first reception code is included in an allowable error range from the first generation code, setting (S700) the first reception code to a first code which corresponds to a start point, if the first reception code departs from the allowable error range from the first generation code, determining (S800) the first reception code as an abnormal code. The same unit count may elapse over time in the virtual code generating means 10 and the virtual code verifying means 20. However, since there may be an error between timers included in the virtual code generating means 10 and the virtual code verifying means 20, there may be the different number of counts which elapses at the same time. Thus, there may be a process of solving the error by the time and determining an abnormal code which is not a normal virtual code. For this purpose, in operation S600, the virtual code verifying means 20 may compare the first generation code which is a first code generated in a specific count by the first function in the virtual code verifying means 20 with the first reception code which is a first code in a virtual code received from the virtual code generating means 10. In operation S700, if the different number of counts between the first generation code and the first reception code is within the allowable error range, the virtual code verifying means 20 may determine the first reception code as a normal code and may perform a search code search process with respect to the first reception code. If the different number of the counts between the first generation code and the first reception code departs from the allowable error range, in operation S800, the virtual code verifying means 20 may determine the first reception code as an abnormal code.

Further, as another embodiment, the method for providing the virtual code may further include, if the virtual code further includes a secure code of a specific-digit number, determining a reception secure code received from the virtual code generating means 10 at the virtual code verifying means 20 is identical to a generation secure code generated in the virtual code verifying means 20 to verify the virtual code.

The above-mentioned method for providing the virtual code according to an embodiment of the inventive concept may be implemented with a program (or an application) to be combined with a computer which is hardware and be executed and may be stored in a medium.

For the computer to read the program and execute the methods implemented with the program, the above-mentioned program may include a code coded into a computer language such as C, C++, Java, or a machine language readable through a device interface of the computer by a processor (CPU) of the computer. Such a code may include a functional code associated with a function and the like defining functions necessary for executing the methods and may include a control code associated with an execution procedure necessary for the processor of the computer to execute the functions according to a procedure. Further, such a code may further include a code associated with memory reference about whether additional information or media necessary for the processor of the computer to execute the functions is referred at any location (address number) of an internal or external memory of the computer. Further, if it is necessary for the processor of the computer to communicate with any computer or server located in a remote place to execute the functions, the code may further include a communication related code about how communication is performed with any computer or server located in a remote place using a communication module of the computer and whether to transmit and receive any information or media upon communication.

The medium may refer to a device-readable medium which stores data on a semi-permanent basis rather than a medium, such as a register, a cache, or a memory, which stores data during a short moment. In detail, the medium may be, for example, but is not limited to, a read only memory (ROM), a random access memory (RAM), a compact disc ROM (CD-ROM), a magnetic tape, a floppy disc, an optical data storage device, or the like. In other words, the program may be stored in various storage media on various servers accessible by the hardware or various storage media on the hardware of the user. The medium may be distributed to a computer system connected over a network and may store a computer-readable code on a distributed basis.

An embodiment of the inventive concept may have the following various effects.

First, since a virtual code is newly generated per unit count and since a duplicated virtual code does not appear in a predetermined entire period, a real code may fail to be hacked when the virtual code is hacked.

Second, since an algorithm for generating a virtual code and searching for a real code is added to only a virtual code generating device and a device using a real code (e.g., a financial institution server, an IOT device, or the like), a conventional process using the real code may be maintained without change. For example, if a virtual card number which is not duplicated and generated is generated and provided to a smart card or an app card, a POS device and a PG server may be maintained to transmit the virtual card number to a card issuer server and the card issuer server may search for a real card number corresponding to the virtual card number to proceed with payment. Thus, a portion which should be changed in a conventional process to enhance security may be minimized, and a user may fail to perform a separate stage for increasing security.

Lastly, there may be a variety of manners of implementing a virtual code generation function. A different virtual code generation function may be applied for each group and for each application field.

While the inventive concept has been described with reference to embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A method for providing a virtual code, the method comprising:
   receiving, by a virtual code verifying device, the virtual code from a virtual code generating device, the virtual code being generated by combining a plurality of detailed codes according to a specific rule, the virtual code being a code generated in connection with a real code at a specific time;
   extracting, by the virtual code verifying device, the plurality of detailed codes included in the virtual code; and
   searching for, by the virtual code verifying device, the real code based on a correlation between the plurality of detailed codes,
   wherein the plurality of detailed codes is changed per a time interval,
   wherein the virtual code verifying device and the virtual code generating device include the same virtual code generation function,
   wherein the virtual code generation function includes a plurality of detailed code generation functions for generating each of the plurality of detailed codes,
   wherein the detailed code generation function applies a specific sorting rule of sorting M characters in an ascending order, and
   wherein the M characters comprise at least one of an uppercase alphabet, a lowercase alphabet, a numeral, and a special character.

2. The method of claim 1, wherein the plurality of detailed codes comprises a first code and a second code,
   wherein the searching for the real code comprises searching for, by the virtual code verifying device, the real code matched with a correlation between the first code and the second code by applying a predetermined search algorithm, according to a specific search scheme.

3. The method of claim 2, wherein, when the first code or the second code of N (N is a natural number) digits is generated with M (M is a natural number) characters, a virtual code generation function comprises a first function or a second function for providing different $M^N$ codes as the first code or the second code changed per the time interval.

4. The method of claim 2, wherein the second code is generated based on the time interval which elapses from a time when the real code for the virtual code generating device is newly generated.

5. The method of claim 2, wherein the searching for the real code comprises:
   when the predetermined search algorithm performs rolling motion of a k-gon on a track where k (k is $M^N$) codes are sorted such that a vertex corresponds to a point where each code is arranged, performing the rolling motion of the k-gon to a point on the track, corresponding to the first code in the virtual code received from the virtual code generating device;
   setting a location corresponding to the first code to a search start point and searching for a storage location in an arrangement state of the k-gon based on the second code according to a search scheme applied to the second code, the storage location being matched to each vertex of the k-gon; and
   searching for the real code stored in the storage location.

6. The method of claim 5, further comprising:
   when a request to newly generate a real code corresponding to the real code in a specific count is received from a specific virtual code generating device, storing the real code in a storage location corresponding to a specific vertex of the k-gon, the specific vertex being a point where the track and the k-gon are met.

7. The method of claim 1, wherein the virtual code verifying device and the virtual code generating device include the same virtual code generation function, and
   wherein the virtual code generation function includes the detailed code combination function including the specific sorting rule.

8. The method of claim 3, further comprising:
   verifying, by the virtual code verifying device, whether one of the first code and the second code corresponds to a normally generated virtual code by inversely applying, by the virtual code verifying device, the first function to the first code or the second function to the second code.

9. The method of claim 2, further comprising:
   comparing a first reception code received from the virtual code generating device with a first generation code generated according to a first function included in the virtual code verifying device;
   when the first reception code is included in an allowable error range from the first generation code, setting the first reception code to the first code which corresponds to a search start point; and
   when the first reception code departs from the allowable error range from the first generation code, determining the first reception code as an abnormal code.

10. A non-transitory computer-readable recording medium storing a program for providing a virtual code, and configured to be coupled to a computer being hardware, the program includes instructions to execute the method of claim 1.

11. A virtual code verifying device for searching for a real code corresponding to the real code based on a virtual code, comprising:
   a hardware processor configured to:
   receive the virtual code from a virtual code generating device, the virtual code being generated by combining a plurality of detailed codes according to a specific rule, the virtual code being a code generated in connection with the real code at a specific time;
   extract the plurality of detailed codes included in the virtual code; and
   search for the real code based on a correlation between the plurality of detailed codes,
   wherein the plurality of detailed codes is changed per a time interval,
   wherein the virtual code verifying device and the virtual code generating device include the same virtual code generation function, wherein the virtual code generation function includes a plurality of detailed code generation functions for generating each of the plurality of detailed codes, wherein the detailed code generation function applies a specific sorting rule of sorting M characters in an ascending order, and wherein the M characters comprise at least one of an uppercase alphabet, a lowercase alphabet, a numeral, and a special character.

\* \* \* \* \*